United States Patent
Itoh et al.

(10) Patent No.: US 8,123,369 B2
(45) Date of Patent: Feb. 28, 2012

(54) SHAFT STRUCTURE OF RETRACTABLE OUTER MIRROR

(75) Inventors: Masahiko Itoh, Shizuoka (JP); Takanobu Matsushita, Shizuoka (JP); Yusuke Hagiwara, Fujieda (JP)

(73) Assignee: Murakami Corporation, Shizuoka (JP)

( * ) Notice: Subject to any disclaimer, the term of this patent is extended or adjusted under 35 U.S.C. 154(b) by 101 days.

(21) Appl. No.: 12/769,201

(22) Filed: Apr. 28, 2010

(65) Prior Publication Data

US 2010/0296185 A1 Nov. 25, 2010

(30) Foreign Application Priority Data

May 21, 2009 (JP) ................................ 2009-123521

(51) Int. Cl.
*G02B 7/182* (2006.01)
*B60R 1/06* (2006.01)
(52) U.S. Cl. ...................... 359/841; 359/872; 359/877
(58) Field of Classification Search .................. 359/841, 359/872, 877
See application file for complete search history.

(56) References Cited

U.S. PATENT DOCUMENTS

| | | | | |
|---|---|---|---|---|
| 4,786,157 A * | 11/1988 | Mori et al. | ..................... | 359/877 |
| 4,809,561 A * | 3/1989 | Tsuyama | ..................... | 74/502.1 |
| 4,919,526 A * | 4/1990 | Umekawa et al. | ............ | 359/841 |
| 4,981,349 A * | 1/1991 | Tamiya et al. | ................ | 359/877 |
| 5,190,499 A * | 3/1993 | Mori et al. | ....................... | 464/36 |
| 5,383,057 A * | 1/1995 | Kimura et al. | ................ | 359/841 |
| 6,132,050 A * | 10/2000 | Sakata et al. | ................... | 359/841 |
| 7,008,067 B2 * | 3/2006 | Hsu | ................. | 359/841 |
| 7,168,816 B2 * | 1/2007 | Yoshida | ........................ | 359/841 |
| 7,393,111 B2 * | 7/2008 | Fuchs et al. | .................... | 359/841 |
| 7,448,762 B2 * | 11/2008 | Su | ................. | 359/841 |
| 7,815,324 B2 * | 10/2010 | Sakata | .......................... | 359/841 |
| 7,887,202 B1 * | 2/2011 | Peterson | ....................... | 359/841 |
| 2009/0279195 A1 | 11/2009 | Itoh et al. | | |

FOREIGN PATENT DOCUMENTS

| JP | 2001-287593 | 10/2001 |
|---|---|---|
| JP | 2001-334874 | 12/2001 |

\* cited by examiner

*Primary Examiner* — Ricky Shafer

(74) *Attorney, Agent, or Firm* — Greenblum & Bernstein P.L.C.

(57) ABSTRACT

In a shaft structure of a retractable outer mirror, a shaft includes: a first member; and a second member. The first member includes: a base section having an attachment boss; a shaft section vertically arranged on the base section; and a catch part by which a catch member is caught. The second member includes: clutch parts that performs an engagement or a release of the engagement in response to rotation of a frame; and an insert portion inserted into a shaft section. The second member is fitted in with the shaft section from above a top end side of the shaft section.

16 Claims, 14 Drawing Sheets

SHAFT STRUCTURE OF RETRACTABLE OUTER MIRROR

CROSS REFERENCE TO RELATED APPLICATION

This application claims the benefit of Japanese Patent Application No. 2009-123521 filed on May 21, 2009, the disclosure of which is incorporated herein by reference.

BACKGROUND OF THE INVENTION

1. Field of the Invention

The present invention relates to a retractable outer mirror attached to or near a side door of an automobile.

2. Description of the Related Art

A typically-used retractable outer mirror is attached to a lateral side of an automobile, and its mirror assembly rotates between two positions. The two positions are: a use position at which a mirror surface is at substantially right angles to the lateral side of the automobile; and a retracted position at which the mirror surface is substantially parallel to the lateral side of the automobile.

For example, Japanese Laid-Open Patent Application, Publication No. 2001-287593 (to be referred to as Patent Document 1 hereinafter) discloses an outer mirror which includes: a shaft vertically arranged on a base section; and a frame attached to the mirror base so as to freely rotate about the shaft. The frame is inserted into the shaft and is energized toward the mirror base by a coil spring, one end of which is in contact with a top end of the shaft. Such a configuration allows the frame (the mirror assembly) to smoothly rotate without rattling.

The shaft includes: a plate-like base section; and a cylindrical shaft section vertically arranged on the base section. The base section includes a plurality of stoppers each protruding thereon and having different size and shape. The stopper performs positioning of the frame (the mirror assembly) and also serves as a clutch mechanism by coming in contact with a plate stopper. When external force acts on the mirror assembly, the clutch mechanism allows the external force to escape and a shock to be absorbed, by making the mirror assembly fall down on a front or a rear side of the automobile. A plurality of protrusions into which a plate clutch is inserted are formed around the cylindrical shaft section.

Shape, size, number, or the like of the stoppers and protrusions formed in the shaft varies according to not only a type of the automobile and whether the above components are attached on a right or left side of the vehicle but also a falling degree of the mirror assembly, a configuration of the clutch mechanism, and whether the outer mirror is retracted by electric motor or manually. This makes it difficult for the shaft used in one place to be used in another, which is not advantageous to a reduction in cost of manufacturing.

Japanese Laid-Open Patent Application, Publication No. 2001-334874 (to be referred to as Patent Document 2 hereinafter) discloses an outer mirror which includes: a right/left use shaft having a plate-like base section and a cylindrical shaft section vertically arranged on the base section; and a first stopper fitted into a through hole formed on the base section, from below the right/left use shaft.

Aright side outer mirror and a left side outer mirror have respective first stoppers different from each other. However, since the right/left use shaft is formed symmetrically, it can be used for both the right side outer mirror and the left side outer mirror. This means that a shaft used for the right side outer mirror can also be used for the left side outer mirror, thus enabling a shared use of components necessary for manufacturing the right and left outer mirrors, which can reduce cost of manufacturing.

A shaft has a configuration in which a convex portion of a first stopper is inserted into a through hole formed on the base section, from below the base section of the right/left use shaft. Thus, if a shape or a position of, for example, the convex portion of the first stopper is modified according to a configuration of a clutch mechanism, a shape or a position of the through hole of the right/left use shaft has to be changed. That is, the inventions according to Patent Document 2 have difficulties in using the same shaft in different types of automobiles or clutch mechanisms, though the same shaft can be used for both the right and left side outer mirrors. This is because modification of a configuration such as a shape of one of the right/left use shaft and the first stopper affects a configuration of the other.

In light of the above-mentioned problems, the present invention has been made in an attempt to provide a shaft structure of a retractable outer mirror enabling a shared use of components necessary for manufacturing outer mirrors regardless of an automobile type, a configuration of a clutch mechanism, whether an outer mirror is retracted by electric motor or manually, or the like.

SUMMARY OF THE INVENTION

A shaft structure of a retractable outer mirror of an automobile includes: a mirror base disposed on a body of the automobile; a shaft fixed to the mirror base; a frame inserted into the shaft; a catch member caught on a side nearer to a top end of the shaft; and an elastic member disposed between the frame and the catch member. The shaft includes: a first member; and a second member. The first member includes: a base section having an attachment boss; a shaft section vertically arranged on the base section; and a catch part by which a catch member is caught. The second member includes: a clutch part that performs an engagement or a release of the engagement in response to rotation of the frame; and an insert portion inserted into the shaft section. The second member is fitted in with the shaft section from above a top end of the shaft section.

The shaft structure of a retractable outer mirror has a configuration in which the second member having a clutch part is fitted in with the first member from above. The configuration eliminates a need of modifying the first member even if the second member is modified according to a configuration of a clutch mechanism or the like. This enables a shared use of components necessary for manufacturing the first member.

At least one of the first member and the second member is preferably, but not necessarily, made of a deep-drawn steel sheet. With the configuration, at least one of the first member and the second member is formed from steel sheet, thus ensuring necessary rigidity. Further, the steel-made first member and/or second member each have a hollow center, thus allowing a reduction in weight. Work hardening generated by the deep-drawing can further increase rigidity of the shaft.

The first member is preferably, but not necessarily, formed line-symmetrically when viewed from the above. The configuration enables a shared use of components necessary for manufacturing the right and left outer mirrors.

A thickness of the base section of the first member is preferably, but not necessarily, larger than a thickness of the shaft section. The configuration enables the shaft to increase bending rigidity.

A bottom surface of the first member is preferably, but not necessarily, flush with a bottom surface of the second member. The configuration enables the shaft to be stably arranged without rattling and to increase bending rigidity.

Preferably, but not necessarily, the catch part includes a guide groove extending from a top end toward a base end of the shaft section; and a catch groove extending from the guide groove toward a circumferential direction of the shaft section. The catch member includes: an insert hole into which the shaft section is inserted; and a protruding part protruding from an inner circumferential surface of the insert hole toward the center of the insert hole. The protruding part of the catch member is inserted into the guide groove of the catch part. The catch member is rotated in a circumferential direction of the shaft section while the elastic member is pressed down. The protruding part is caught at the catch groove with energizing force of the elastic member. The configuration enables the catch member to be easily caught by the shaft.

Other features and advantages of the present invention will become more apparent from the following detailed description of the invention, when taken in conjunction with the accompanying exemplary drawings.

DETAILED DESCRIPTION OF THE EXEMPLARY EMBODIMENTS

First Embodiment

Next are described in detail embodiments of the present invention with reference to the attached drawings. Note that an up and down direction referred to in the following description is based on an up and down direction of an auto body S.

Figure 1:
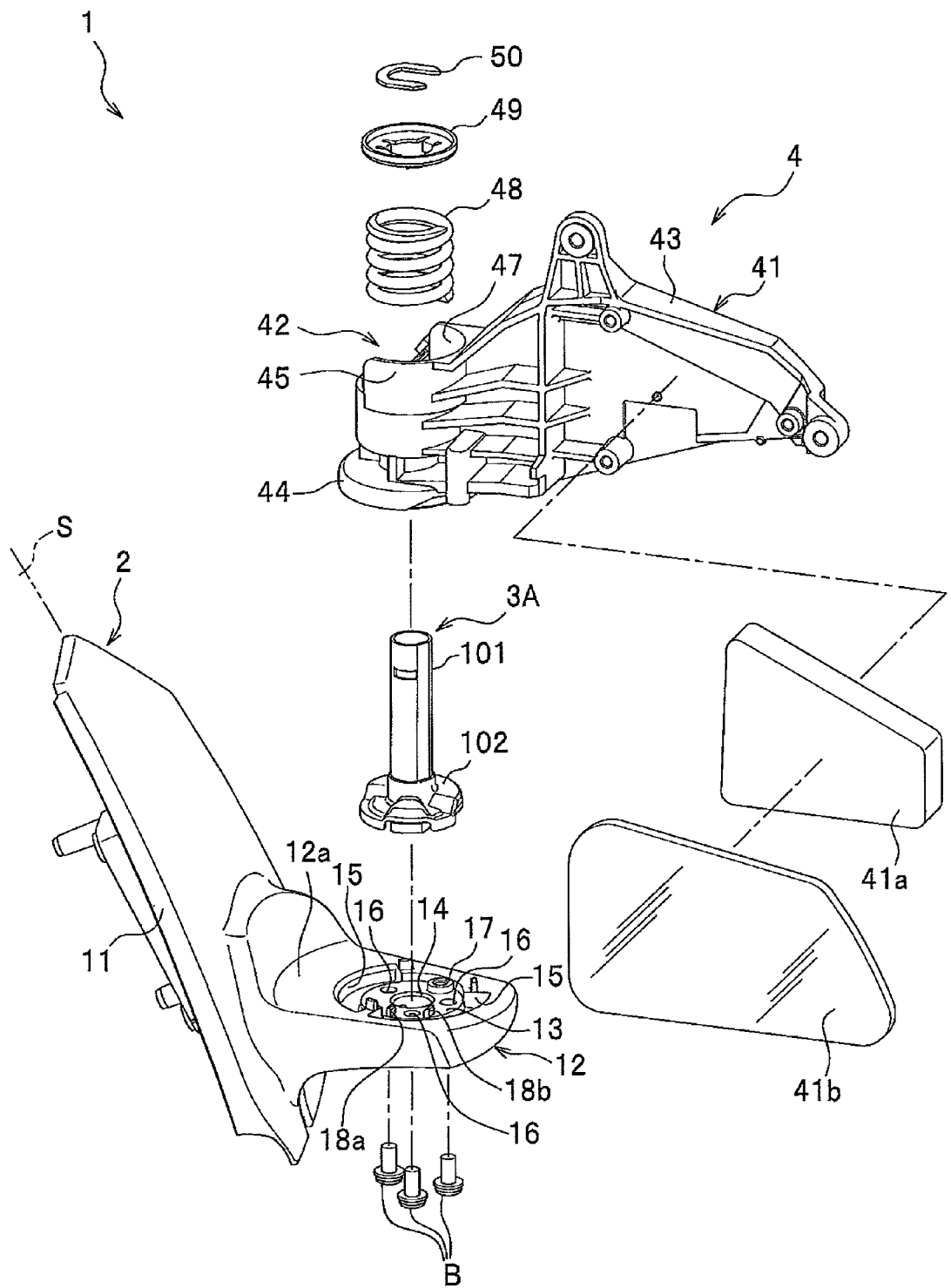
FIG. 1 is an exploded perspective view of an outer mirror according to a first embodiment.

As shown in FIG. 1, a retractable outer mirror (which may also be simply referred to as an outer mirror) 1 according to the first embodiment is a so-called door mirror which is attached to or near a side door of the auto body S of an automobile or the like. The outer mirror 1 includes: a mirror base 2 extending from a lateral face of the auto body S along a lateral side thereof; a shaft 3A fixed to the mirror base 2; and a mirror assembly 4 attached to the mirror base 2 so as to be able to rotate in a substantially horizontal direction about the shaft 3A.

The mirror base 2 is made of resin and supports the mirror assembly 4 via the shaft 3A. As shown in FIG. 1, the mirror base 2 includes, as main components: a base attachment section 11 attached to the auto body S; and a support section 12 laterally extending from the base attachment section 11.

The base attachment section 11 is attached to the auto body S with a fixture member such as a machine screw, from inside thereof. The support section 12 includes: a seating face 13 on which the shaft 3A is placed; a through hole 14 created at the center of the seating face 13; restriction grooves 15, 15 formed around the seating face 13; machine screw holes 16, 16, 16 penetrating the seating face 13; a positioning boss 17 formed on an upper surface of the seating face 13; and positioning protrusions 18a, 18b protruding on the upper surface of the seating face 13.

The seating face 13 is formed in a position one step down from a top surface 12a of the support section 12. The seating face 13 is formed of a substantial round when viewed from the above in accordance with a contour of a bottom face of the shaft 3A. An electric cord or the like for supplying power to the mirror assembly 4 is inserted into the through hole 14 formed at the center of the seating face 13.

The restriction grooves 15.15 are each formed of an arc when viewed from the above along an outline of the seating face 13. A bottom face of the restriction groove 15 is formed in a position one step down from the seating face 13. The restriction groove 15 restricts rotation of the mirror assembly 4 by engaging with a stopper 46 (see FIG. 7) of a pivot member 42 to be described later.

The machine screw holes 16, 16, 16 are formed in respective positions corresponding to those of attachment bosses (namely, a first attachment boss 114, a second attachment boss 115, and a third attachment boss 116; see FIG. 2) of the shaft 3A. A machine screw B is screwed into the machine screw hole 16, to thereby fix the shaft 3A. The positioning boss 17 protrudes in a form of a ring when viewed from the above, on the upper surface of the seating face 13. A positioning member 117 (see FIG. 2) to be described later of the shaft 3A is fitted into the positioning boss 17.

The positioning protrusions 18a, 18b are protruded on the upper surface of the seating face 13. An extended portion 113a (see FIG. 2) of a base section 111 to be described later is fitted between the positioning protrusions 18a, 18b. The positioning boss 17 and the positioning protrusions 18a, 18b facilitate a positioning of the shaft 3A.

The shaft 3A is disposed on the mirror base 2 and rotatably supports the mirror assembly 4, as shown in FIG. 1. The shaft 3A is formed by fitting a first member 101 and a second member 102 together. Next are described in detail respective configurations of the first member 101 and the second member 102.

Figure 2A:
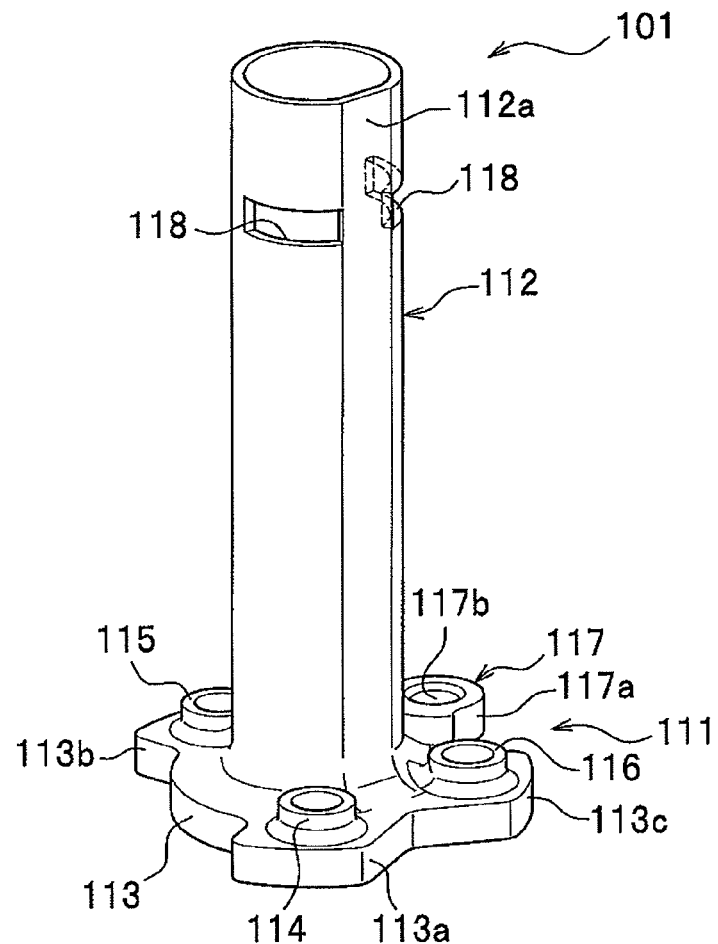
FIG. 2A and FIG. 2B are a perspective view and a plan view each illustrating a first member of a shaft according to the first embodiment, respectively.
Figure 2B:
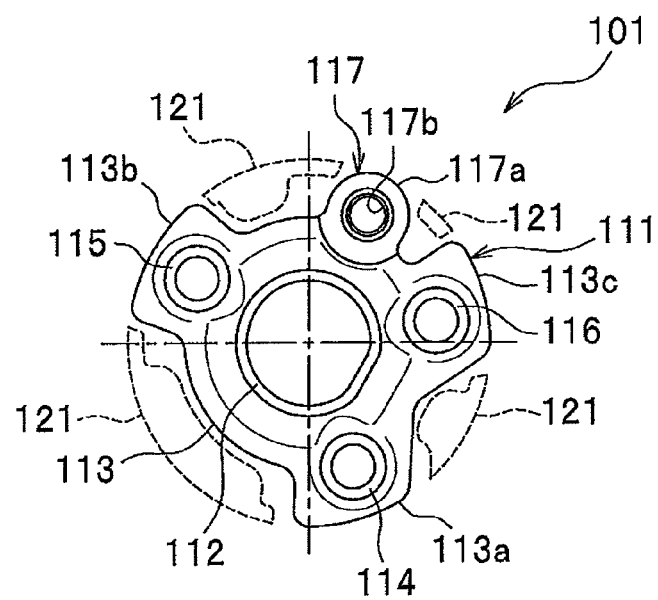

As shown in FIG. 2A and FIG. 2B, the first member 101 includes, as main components: a base section 111; and a shaft section 112 vertically arranged on the base section 111.

The base section 111 includes: a plate-like base member 113; the first attachment boss 114, the second attachment boss 115, and the third attachment boss 116 each formed on the base member 113; and a positioning member 117. The base member 113 includes extended portions 113a, 113b, 113c radially extending from the shaft section 112 in three directions when viewed from the above. A bottom of the base member 113 is formed flush, to thereby come in contact with the seating face 13 of the mirror base 2. Exterior edges of the extended portions 113a, 113b, 113c are concyclic.

The first, second, and third attachment bosses 114, 115, 116 are formed in positions corresponding to those of the machine screw holes 16, 16, 16 of the mirror base 2 in the extended portions 113a, 113b, 113c, respectively. The first member 101 is fixed by the machine screws B, B, B (see FIG. 1) screwed into the first, second, and third attachment bosses 114, 115, 116, respectively.

The positioning member 117 includes: a connecting portion 117a continuously formed with the base member 113; and a pin 117b (see FIG. 3C) formed on a lower surface of the connecting portion 117a. The positioning member 117 is formed between the extended portions 113b and 113c. The pin 117b is fitted into the positioning boss 17 (see FIG. 1) of the mirror base 2, to thereby perform a positioning of the first member 101.

The shaft section 112 is substantially vertically arranged on the base section 111 and is inserted into a frame 41 which is disposed in the mirror assembly 4. The shaft section 112 is formed in a substantially cylindrical shape. A flatly-formed positioning face 112a is disposed on an outer circumferential surface of the shaft section 112. The positioning face 112a performs a positioning of the second member 102 to be described later.

Catch parts 118, 118 each of which penetrates an outer circumference of the shaft section 112 and has a rectangle shape when viewed from a side are formed on a side nearer to a top end of the shaft section 112. The catch part 118 is caught by a catch member 50 (see FIG. 1). The number or shape of the catch part 118 is determined according to a shape of the catch member 50.

Figure 3A:
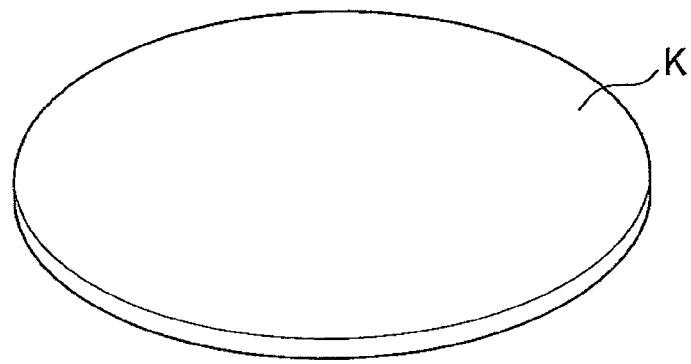
FIG. 3A to FIG. 3C are perspective views successively illustrating a method of forming the first member of the shaft according to the first embodiment.
Figure 3B:
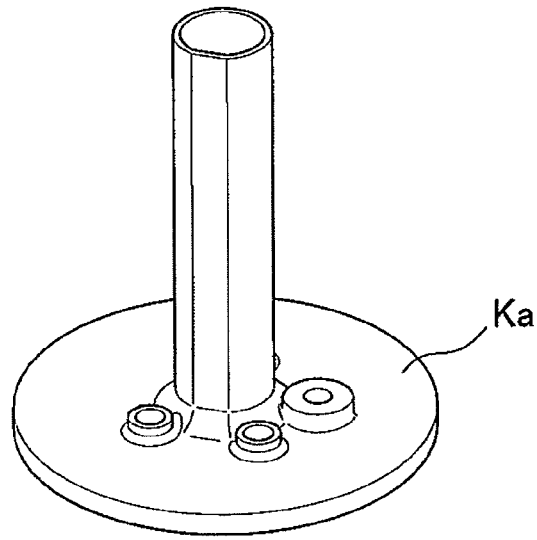
Figure 3C:
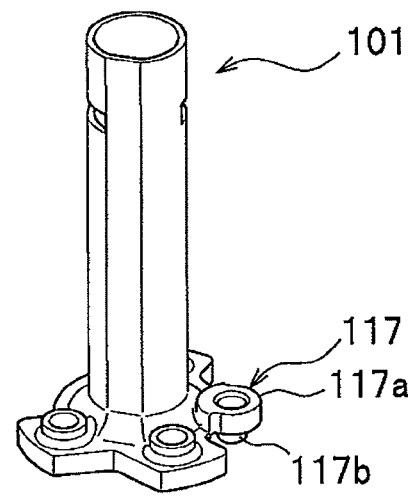

As shown in FIG. 3A to FIG. 3C, the first member 101 in this embodiment is formed into a single unit by deep-drawing a steel sheet. As shown in FIG. 3A and FIG. 3B, the deep-drawing is performed by pressing a thin steel sheet K from one face side thereof using a pressing tool having a contour similar to that of the first member 101. As shown in FIG. 3B and FIG. 3C, an unnecessary portion Ka which is formed around a portion drawn from the surface is trimmed. Hole drilling is performed on a portion where the attachment bosses and the like are to be formed, to thereby obtain the first member 101.

The first member 101 in this embodiment is formed to have a sheet thickness of the base member 113 larger than that of the shaft section 112 by deep-drawing the steel sheet K having a thickness of, for example, about 3.2 mm. In this embodiment, the first member 101 is formed by the deep-drawing. However, the first member 101 may be formed by any other suitable machining method.

Figure 4A:
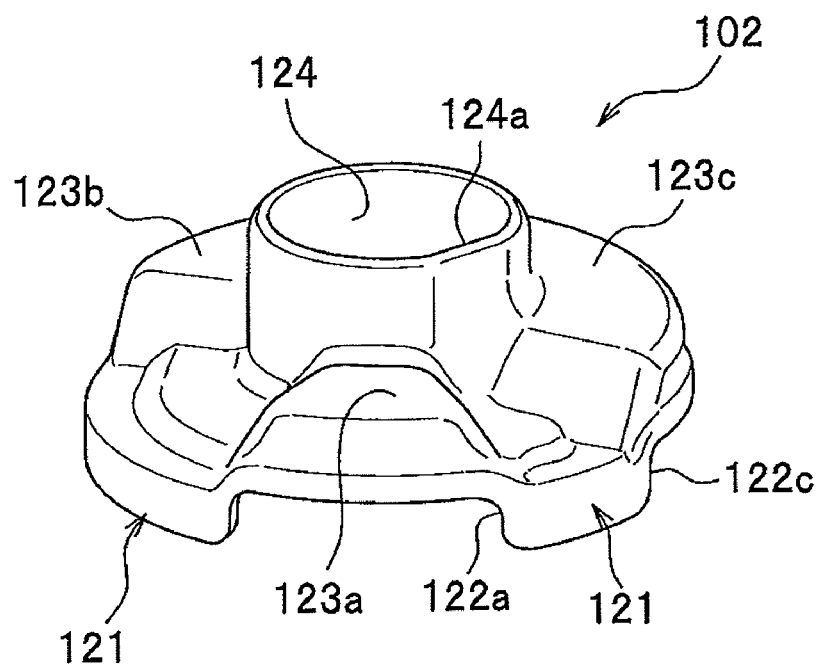
FIG. 4A and FIG. 4B are perspective views each illustrating a second member of the shaft according to the first embodiment, when viewed from the front and the back, respectively.
Figure 4B:
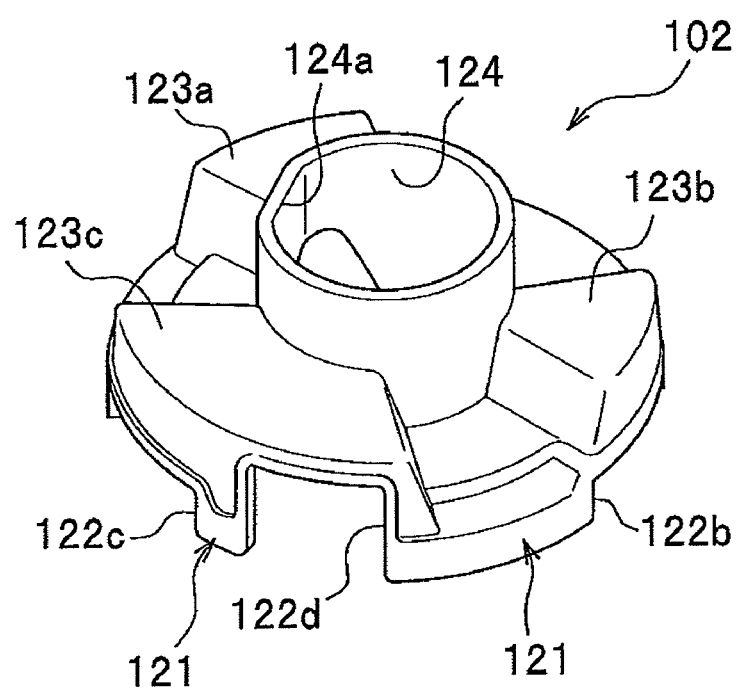

As shown in FIG. 4A and FIG. 4B, the second member 102 includes: an outer circumferential portion 121; outer circumferential opening portions 122a to 122d each opening in a transverse direction at the outer circumferential portion 121; a first convex portion 123a to a third convex portion 123c (which may be collectively referred to as a clutch part); and an insert portion 124 vertically penetrating the center of the second member 102.

The outer circumferential portion 121 constitutes an outer periphery of the second member 102 and is formed of a round when viewed from the above. A radius of the outer circumferential portion 121 is equal to that of the first member 101.

The outer circumferential opening portions 122a, 122b, 122c each open at a prescribed height from a bottom edge of the outer circumferential portion 121 in the transverse direction. The outer circumferential opening portions 122a, 122b, 122c open in positions corresponding to the extended portions 113a, 113b, 113c of the first member 101, respectively. The outer circumferential opening portions 122a, 122b, 122c each open at a height at least larger than a sheet thickness of the base member 113 of the first member 101. As shown in FIG. 4B, the outer circumferential opening portion 122d is formed in a position corresponding to the positioning member 117. The outer circumferential opening portion 122d opens at a height at least larger than that of the positioning member 117.

The first convex portion 123a, second convex portion 123b, and third convex portion 123c serve as a clutch mechanism by engaging with engagement portions (not shown) of the frame 41 to be described later. The first convex portion 123a, second convex portion 123b and third convex portion 123c are hollow and bulge upward. If the first member 101 and the second member 102 are fitted together, the first to third attachment bosses 114 to 116 are housed in the first to third convex portions 123a to 123c, respectively. The first to third convex portions 123a to 123c do not need to have specific shapes or to be arranged in specific positions. The first to third convex portions 123a to 123c are formed in conformity with shapes or positions of the attachment bosses or the engagement portions (not shown) formed in the frame 41.

The insert portion 124 opens vertically penetrating the second member 102. The shaft section 112 of the first member 101 is inserted into the insert portion 124. The insert portion 124 is formed to have a horizontal cross section substantially same as that of the shaft section 112. The insert portion 124 has a flatly-formed positioning face 124a on a portion of an inner circumferential surface thereof. In fitting the first member 101 and the second member 102 together, the positioning face 124a and the positioning face 112a (see FIG. 2) of the first member 101 are overlaid and aligned with each other, which facilitates the positioning. Further, the overlaid positioning face 124a and positioning face 112a prevents the second member 102 from rotating with respect to the first member 101.

Figure 5A:
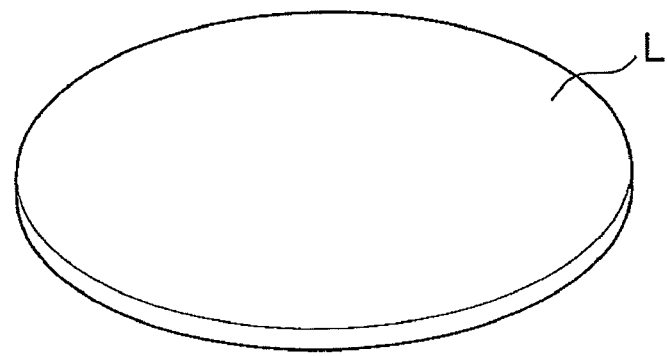
FIG. 5A to FIG. 5C are perspective views successively illustrating a method of forming the second member of the shaft according to the first embodiment.
Figure 5B:
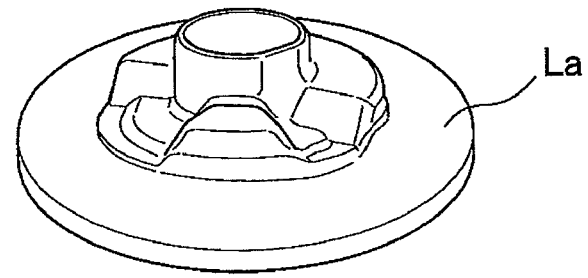
Figure 5C:
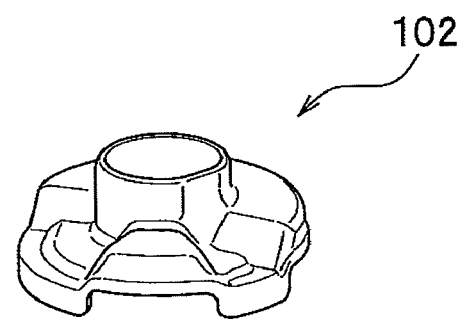

As shown in FIG. 5, the second member 102 in this embodiment is formed into a single unit by deep-drawing a steel sheet. As shown in FIG. 5A and FIG. 5B, the deep drawing is performed by pressing a thin steel sheet L from one surface side using a pressing tool having a contour similar to that of the second member 102. As shown in FIG. 5B and FIG. 5C, an unnecessary portion La which is formed around a portion drawn from the surface is trimmed. In this embodiment, the second member 102 is formed with the deep drawing. However, the second member 102 may be formed with any other suitable machining method.

Figure 6:
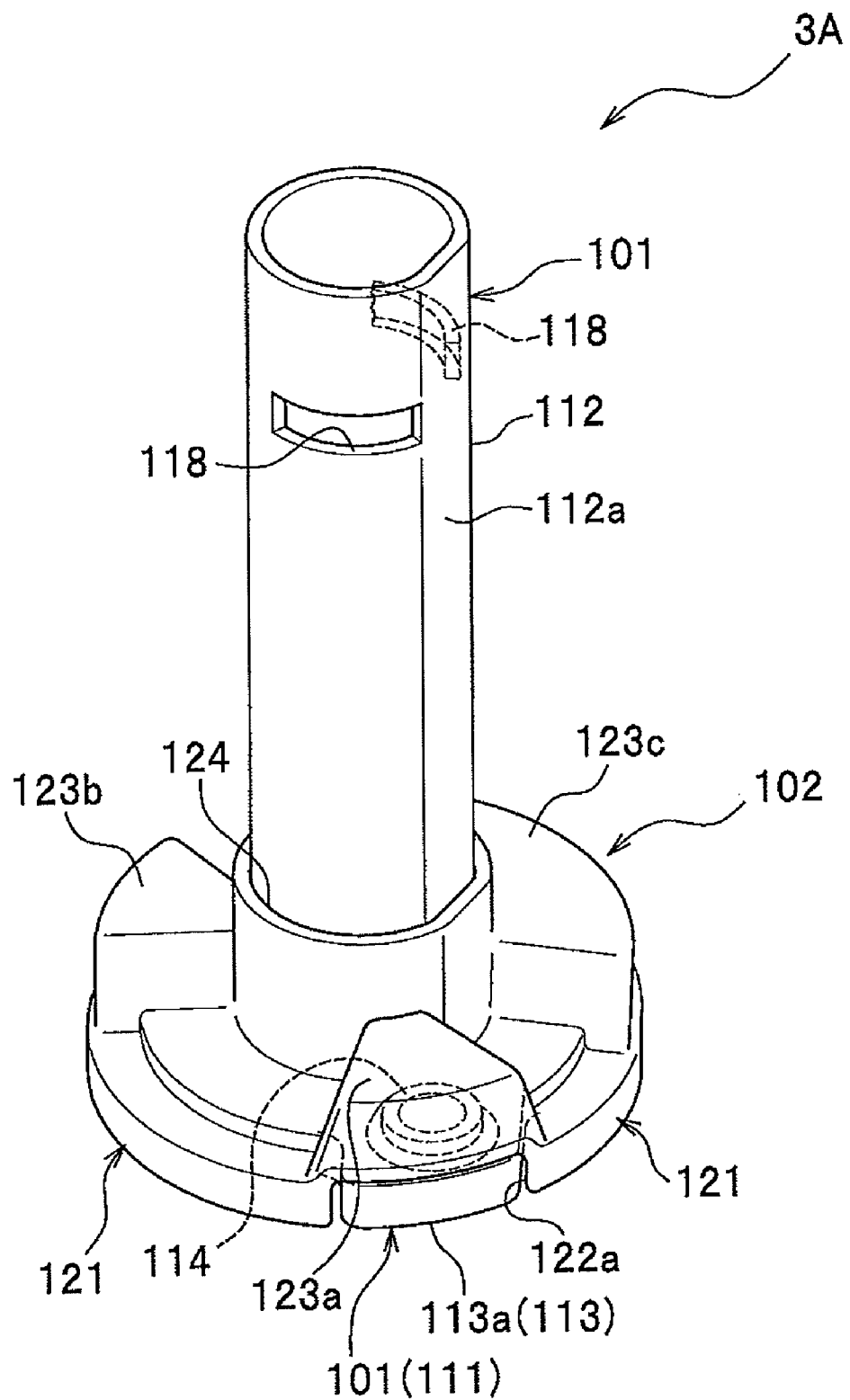
FIG. 6 is a perspective view illustrating the shaft according to the first embodiment.

As shown in FIG. 6, the shaft 3A is formed by inserting the insert portion 124 of the second member 102 into the shaft section 112 of the first member 101 from above the top end thereof. After the shaft section 112 is fitted in with the insert portion 124 of the second member 102, the second member 102 is moved downward, to thereby come a top portion of the base section 111 of the first member 101 in contact with an inside of the second member 102. Thus, the extended portion 113a and the first attachment boss 114 of the first member 101 are covered over by the first convex portion 123a of the second member 102. Similarly, the extended portion 113b and the second attachment boss 115 of the first member 101 are covered over by the second convex portion 123b of the second member 102. The extended portion 113c and the third attachment boss 116 of the first member 101 are covered over by the third convex portion 123c of the second member 102. And, the positioning member 117 of the first member 101 is covered over by the third convex portion 123c.

The bottom of the base member 113 is formed flush, to thereby make the base section 111 of the first member 101 flush with a bottom of the outer circumferential portion 121 of the second member 102. An exterior edge of the base section 111 of the first member 101 and an exterior edge of the outer circumferential portion 121 of the second member 102 are concyclic. As shown in FIG. 2B, upon fitting the first member 101 and the second member 102 together, the outer circumferential portions 121 of the second member 102 are positioned each between the extended portion 113a, the extended portion 113b, the positioning member 117, and the extended portion 113c of the first member 101.

Figure 7:
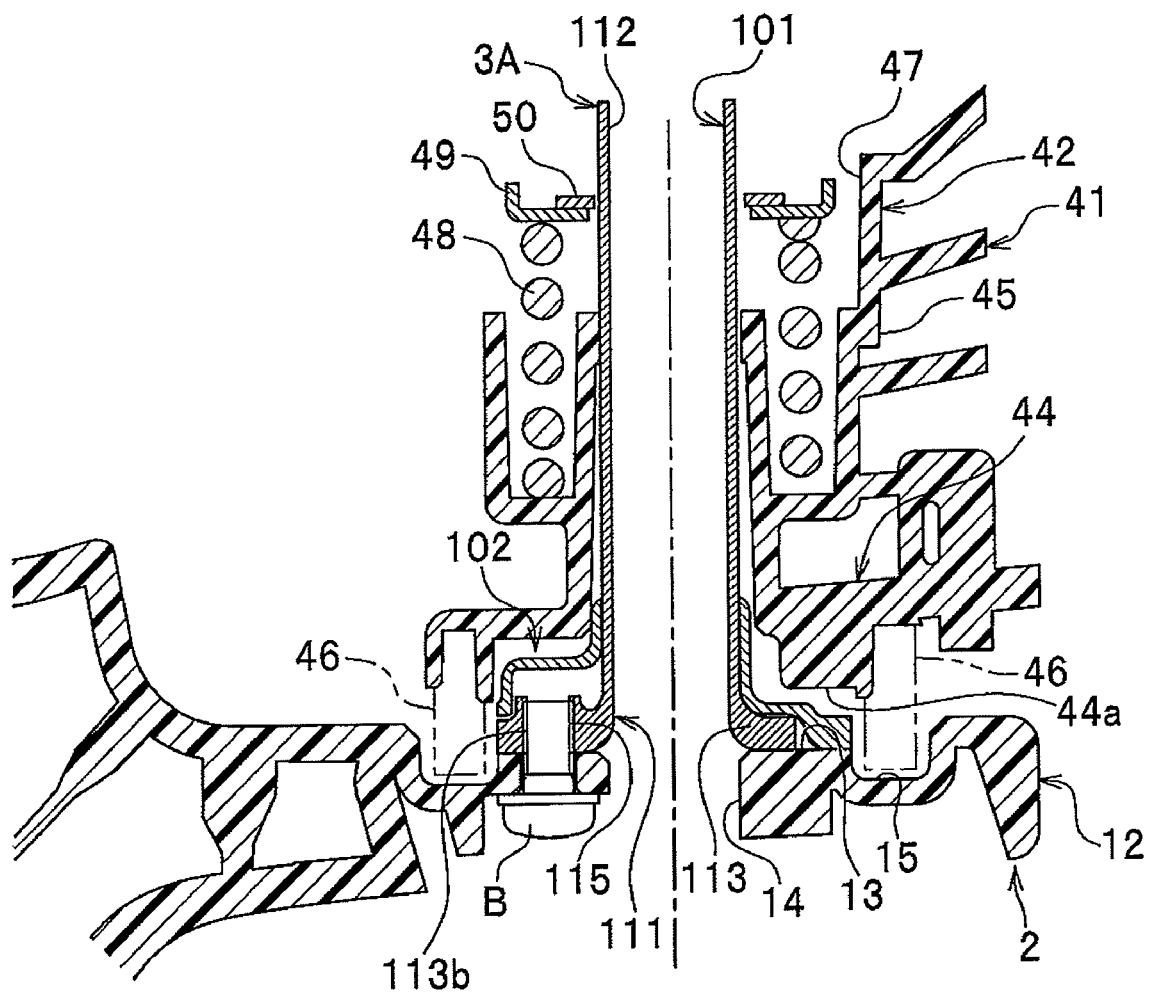
FIG. 7 is a cross sectional view illustrating how the shaft is assembled according to the first embodiment.

As shown in FIG. 1 and FIG. 7, the shaft 3A is disposed on the seating face 13 of the mirror base 2, to thereby come the bottom surface of the shaft 3A in close contact with the seating face 13 of the mirror base 2.

As shown in FIG. 1, the mirror assembly 4 includes: a frame 41 inserted into the shaft 3A; an actuator 41a attached to the frame 41; a mirror 41b attached to the actuator 41a; and a housing not shown for housing the frame 41, the actuator 41a, and the mirror 41b.

The frame 41 includes: a pivot member 42 into which the shaft 3A is inserted; and a support member 43 laterally extending from the pivot member 42. As shown in FIG. 7, the pivot member 42 has a cylindrical hollow portion at its center, into which the shaft 3A is inserted. The pivot member 42 includes: a pivot lower portion 44 engaging with the shaft 3A; and a pivot upper portion 45 accommodating a coil spring 48.

The pivot lower portion 44 has an engagement portion 44a inside thereof, which engages with the first to third convex portions 123a to 123c as the clutch part of the shaft 3A. The clutch mechanism works by engaging or releasing respective convex portions 123a to 123c of the shaft 3A with or from the engagement portion 44a of the pivot lower portion 44. That is, if the mirror assembly 4 is in a use position and is subjected to external force from a front or a rear side of the auto body S, the engagement portion 44a moves over the convex portions 123a to 123c of the shaft 3A. This allows the mirror assembly 4 to rotate about the shaft 3A. Thus, even if the mirror assembly 4 is subjected to external force, the outer mirror can be prevented from being damaged by allowing the external force to escape.

The pivot lower portion 44 has stoppers 46, 46 outside thereof, in which the respective restriction grooves 15, 15 (see FIG. 1) move. The stopper 46 moves inside the restriction groove 15 along with the mirror assembly 4. Contact of the stopper 46 with an end face of the restriction groove 15 restricts a movement of the mirror assembly 4.

The pivot upper portion 45 includes a circular convex portion 47 formed around the shaft 3A. The coil spring 48 (which may also be referred to as an elastic member) is arranged in the convex portion 47. An upper end of the coil spring 48 is fixed to a catch member 50 via an annular washer 49. The catch member 50 is substantially horseshoe-shaped when viewed from the above as shown in FIG. 1 and is caught by catch parts 118. 118 formed on a side nearer to the top end of the shaft 3A. That is, the coil spring 48 is arranged in a compressed state between the pivot upper portion 45 and the washer 49. Restoring force of the coil spring 48 presses the frame 41 toward the mirror base 2.

When the frame 41 (of the mirror assembly 4) is rotated, the frame 41 is once lifted up due to the engagement between the first to third convex portions 123a to 123c as the clutch mechanism and the engagement portion 44a of the frame 41. The frame 41 is then returned to its original position by energizing force of the coil spring 48.

The support member 43 supports the actuator 41a. The support member 43 laterally extends from the pivot member 42 and has boss holes and the like for holding the actuator 41a. The actuator 41a retractably holds the mirror 41b.

As described above, the shaft 3A according to the first embodiment has a configuration in which the second member 102 including the clutch part (namely, the first to third convex portions 123a to 123c) is fitted in with the first member 101 by inserting the second member 102 from above the first member 101. Thus, even if the second member 102 is modified in accordance with a structure of the clutch mechanism, the first member 101 does not require corresponding modification. Below in a second embodiment is described a shared use of the first member 101 in various configurations in which the second member 102 is modified.

Second Embodiment

Next is described the second embodiment of the present invention. The outer mirror according to this embodiment assumes a case where the outer mirror is manually rotated, and a clutch mechanism is configured to work by engaging a guide hole on a shaft side with a positioning ball on a mirror assembly side. The outer mirror according to the second embodiment has a configuration similar to that of the first embodiment except a second member of the shaft. Thus, in the second embodiment, the same names and reference numerals are used for the components having the substantially same functions as those in the first embodiment, and detailed description thereof is omitted herefrom.

Figure 8:
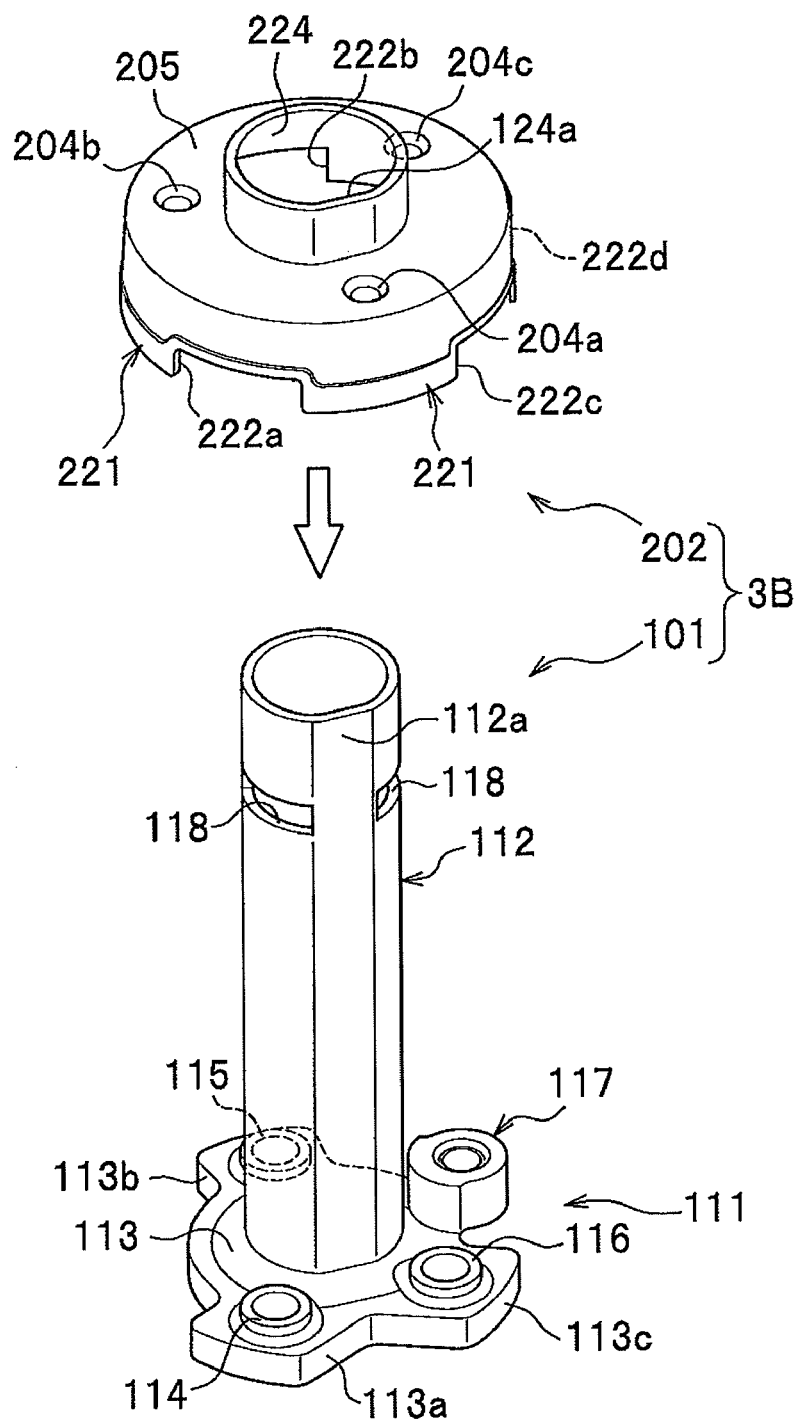
FIG. 8 is an exploded perspective view illustrating a shaft according to a second embodiment.

As shown in FIG. 8, a shaft 3B according to the second embodiment is formed by fitting the first member 101 and a second member 202 together. The first member 101 used herein is the same as that of the first embodiment.

The second member 202 includes: an outer circumferential portion 221; outer circumferential opening portions 222a to 222d each opening in a transverse direction at the outer circumferential portion 221; guide holes 204a, 204b, 204c (which may be collectively referred to as a clutch part); and an insert portion 224 vertically penetrating the center of the second member 202. The second member 202 has a hollow portion inside thereof. The second member 202 is formed by deep-drawing a steel sheet.

Guide holes 204a to 204c are formed as recesses on a flatly-formed upper surface 205. The guide holes 204a to 204c engage with respective positioning balls 242 of the frame 241 to be described later.

The shaft 3B is formed by inserting an insert portion 224 of the second member 202 into the shaft section 112 of the first member 101 from above the top end thereof. After the shaft section 112 is fitted in with the insert portion 224 of the second member 202, the second member 202 is moved downward, to thereby come a top portion of the base section 111 of the first member 101 in contact with an inside of the second member 202. The base section 111 of the first member 101 is housed in the hollow portion inside the second member 202. Thus, the extended portions 113a to 113c of the first member 101 are covered over by the outer circumferential opening portions 222a to 222c. Similarly, the positioning member 117 of the first member 101 is covered over by an outer circumferential opening portion 222d.

A bottom of the shaft 3B is formed flush to thereby make the base section 111 of the first member 101 flush with a bottom of the outer circumferential portion 221 of the second member 202. The exterior edge of the base section 111 of the first member 101 and an exterior edge of the outer circumferential portion 121 of the second member 202 are concyclic.

Figure 9:
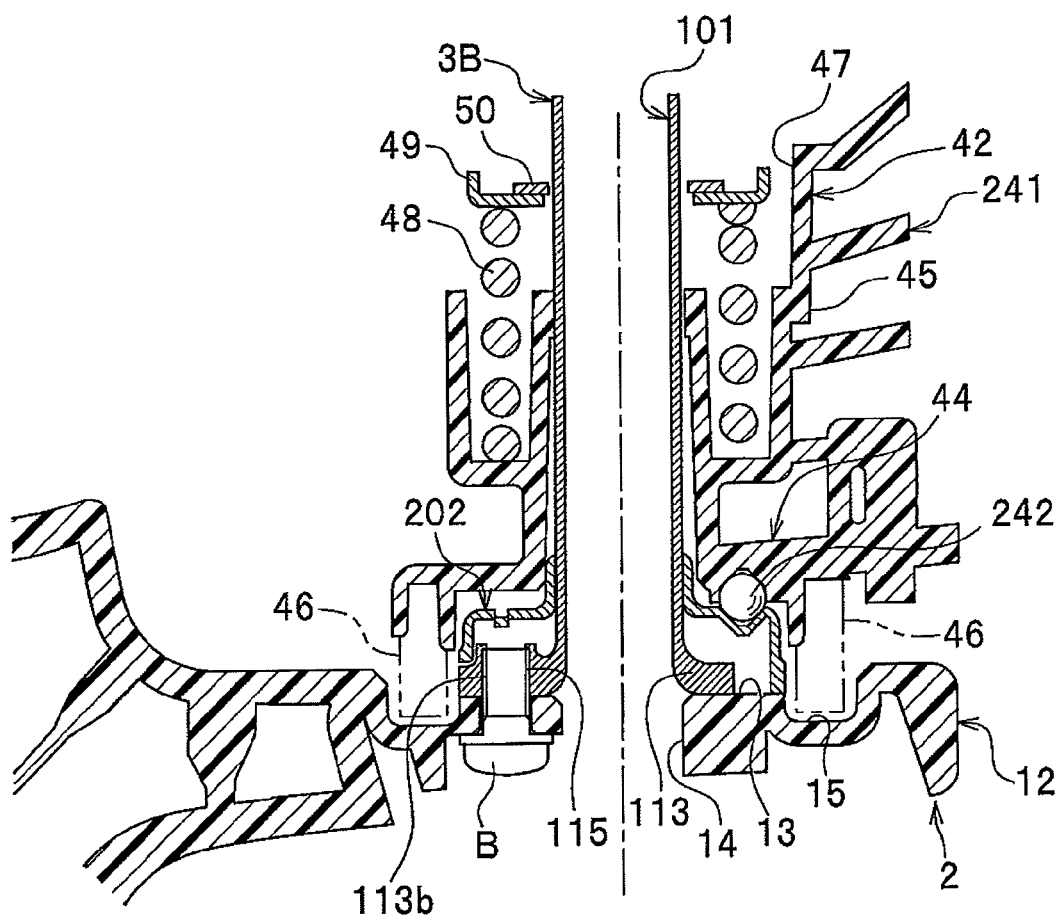
FIG. 9 is a cross sectional view illustrating how the shaft is assembled according to the second embodiment.

As shown in FIG. 9, three positioning balls 242 (only one positioning ball 242 is shown) constituting a clutch mechanism are disposed on a bottom of the frame 241 which is internally arranged in the mirror assembly 4 engaging with the shaft 3B. The clutch mechanism according to this embodiment is constituted by the guide holes 204a to 204c formed on the second member 202 of the shaft 3B and three positioning balls 242, 242, 242 disposed in the frame 241. That is, if the mirror assembly 4 is in the use position and is subjected to external force from a front or a rear side of the auto body S, the positioning balls 242, 242, 242 come off the respective guide holes 204a, 204b, 204c. This allows the mirror assembly 4 to rotate about the shaft 3B. Thus, even if the mirror assembly 4 is subjected to external force, the outer mirror can be prevented from being damaged by allowing the external force to escape. In this embodiment, the frame 241 is pressed toward the mirror base 2 by the coil spring 48, and the mirror assembly 4 can therefore rotate smoothly without rattling.

According to the first embodiment and the second embodiment as described above, the first member 101 can be used both for the shaft 3A and the shaft 3B, though the respective clutch mechanisms are different. That is, in both the first embodiment and the second embodiment, the second member 102 (202 in the second embodiment, ditto below) is configured to be fitted in with the first member 101 by inserting the second member 102 from above the first member 101. Thus, even if the second member 102 is modified in shape, the first member 101 does not require corresponding modification. This enables a shared use of the first member 101 in various configurations, thus allowing a reduction in cost of manufacturing.

In Patent Document 2, a shaft has a configuration in which a first member (the right/left use shaft of Patent Document 2) is unitarily formed with a second member (the first stopper of Patent Document 2) using a machine screw. In the first and second embodiments of the present invention, however, it is not necessary for the first member 101 to be unitarily formed with the second member 102 (202) using a machine screw. This can reduce necessary operations and the number of components. The shaft 3A (3B) in the embodiments is, in an assembled state, pressed down by the coil spring 48 via the frame 41 (241). The first member 101 and the second member 102 (202) will not separate in a vertical direction.

The first member 101 and the second member 102 (202) are formed from steel sheet, which ensures necessary rigidity. Further, the steel-made first member 101 and second member 102 (202) are each formed to have a hollow center, thus allowing a reduction in weight. Work hardening generated by the deep-drawing in the embodiments can further increase rigidity of the shaft 3A (3B). The base section 111 of the first member 101 is thicker than the shaft section 112, thus allowing an increase in bending rigidity.

The bottom surface of the first member 101 is made flush with the bottom surface of the second member 102 (202). This enables the shaft 3A (3B) to be stably arranged without rattling and to increase bending rigidity. Exterior edges of the first member 101 and the second member 102 (202) are made concyclic. This ensures excellent performance in being assembled with the seating face 13 of the mirror base 2.

Third Embodiment

Next is described a third embodiment of the present invention. An outer mirror according to the third embodiment has a configuration similar to that of the first embodiment except that the outer mirror rotates by electric motor and is provided with two clutch mechanisms. Thus, in the third embodiment, detailed description is omitted except the shaft and a motor-driven retraction unit attached to the shaft.

Figure 10:
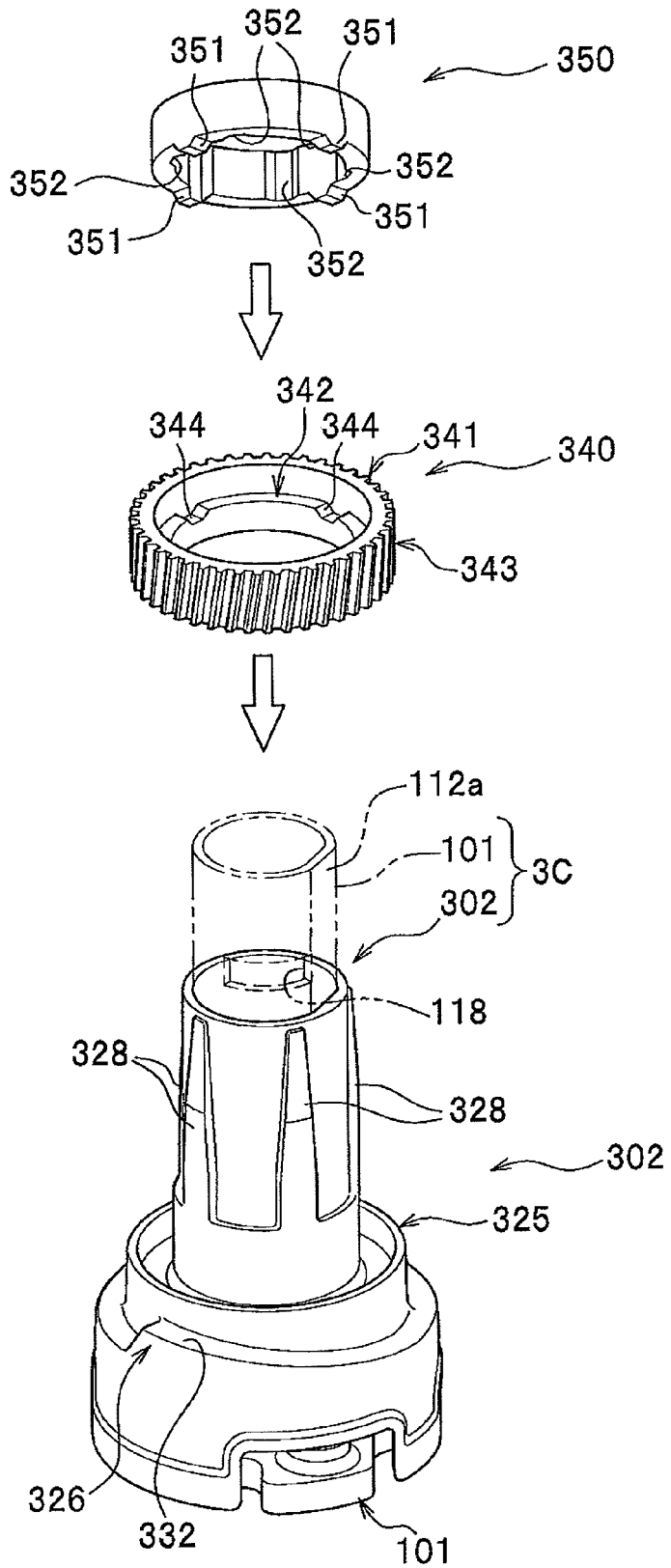
FIG. 10 is a perspective view illustrating a shaft, a plate gear, and a plate clutch according to a third embodiment.

As shown in FIG. 10, a shaft 3C according to the third embodiment is formed by fitting the first member 101 and a second member 302 together. The first member 101 herein used is the same as that of the first embodiment.

Figure 11A:
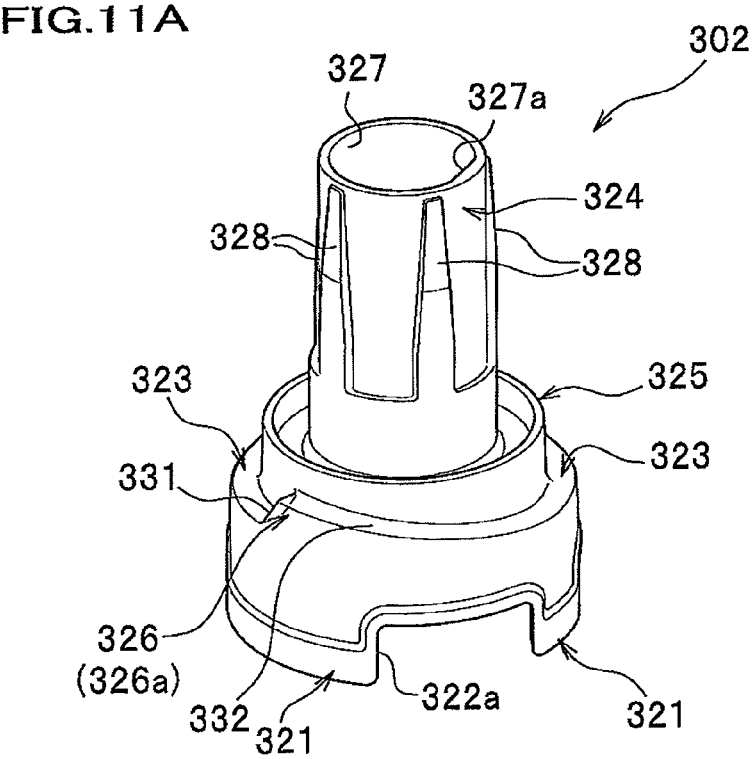
FIG. 11A and FIG. 11B are perspective views each illustrating a second member of the shaft according to the third embodiment, when viewed from the front and the back, respectively.

As shown in FIG. 11, the second member 302 includes: an outer circumferential portion 321; outer circumferential opening portions 322a to 322d each opening in a transverse direction at the outer circumferential portion 321; an upper surface 323 forming an upper surface of the outer circumferential portion 321; a cylindrical portion 324 vertically arranged on the center of the upper surface 323; an upright portion 325 vertically disposed around the cylindrical portion 324; and restriction portions 326a, 326b (which may be collectively referred to as a clutch part) formed around the upright portion 325. A plurality of protrusions 328 are formed around the cylindrical portion 324. The second member 302 is formed by deep-drawing a steel sheet.

The outer circumferential portion 321 constitutes an outer periphery of the second member 302 and is formed of a round when viewed from the above. A radius of the outer circumferential portion 321 is substantially equal to that of the first member 101.

Figure 11B:
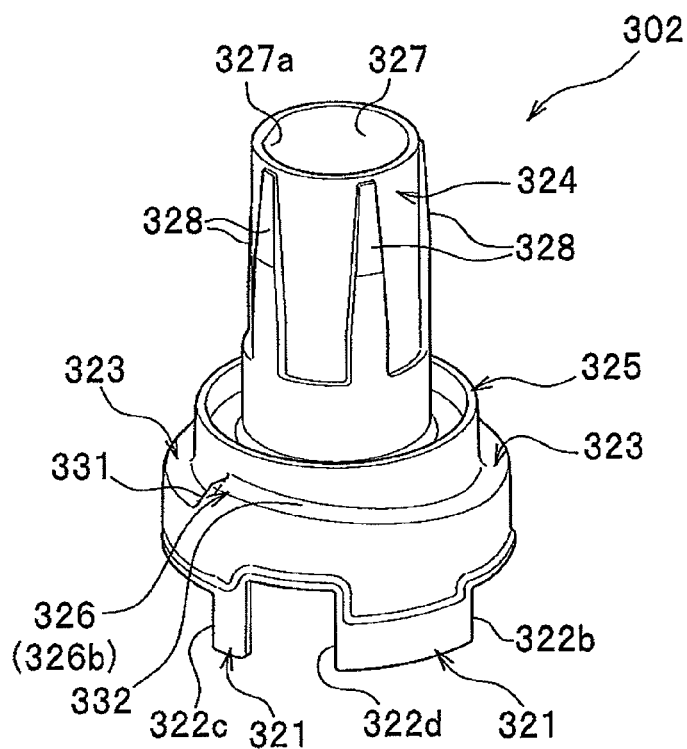

The outer circumferential opening portions 322a, 322b, 322c each open at a prescribed height from a bottom edge of the outer circumferential portion 321 in the transverse direction. The outer circumferential opening portions 322a, 322b, 322c open in positions corresponding to the extended portions 113a, 113b, 113c of the first member 101, respectively. The outer circumferential opening portions 322a, 322b, 322c each open at a height at least larger than a sheet thickness of the base member 113 of the first member 101. As shown in FIG. 11B, the outer circumferential opening portion 322d is formed in a position corresponding to the positioning member 117 (see FIG. 2). The outer circumferential opening portion 322d opens at a height substantially same as that of the positioning member 117.

The upper surface 323 covers an upward portion of the outer circumferential portion 321. The cylindrical portion 324 is arranged substantially vertically with respect to the upper surface 323 and has a substantially cylindrical shape. The cylindrical portion 324 has a hollow portion inside thereof, in which an insert portion 327 is formed. The first member 101 is inserted into the insert portion 327. The insert portion 327 has a flatly-formed positioning face 327a on a portion of an inner circumferential surface thereof. In fitting the first member 101 and the second member 302 together, the positioning face 327a of the second member 302 and the positioning face 112a (see FIG. 10) of the first member 101 are overlaid and aligned with each other, which facilitates the positioning. Further, the overlaid positioning face 327a prevents the second member 302 from rotating with respect to the first member 101.

The cylindrical portion 324 has five protrusions 328 with the same shape, on an outer circumferential surface thereof. The protrusion 328 is wider in a lower portion thereof than in an upper portion thereof when viewed from a side. The protrusions 328 are formed equally spaced on an outer circumferential surface of the cylindrical portion 324. The protrusions 328 serve as positioning members (detents) of the plate clutch 350 to be described later.

The upright portion 325 is formed in a round shape when viewed from the above, around the cylindrical portion 324 on the upper surface 323. An enclosure 363 (see FIG. 12) of a motor-driven retraction unit 360 to be described later is disposed inside and outside of the upright portion 325.

The restriction portions 326a, 326b are formed on an outer end of the upper surface 323. The restriction portions 326a, 326b have the same shape and are formed in a symmetrical position with respect to the center of the second member 302.

The restriction portions 326a, 326b each include: a contact part 331 sloping from the upper surface 323 to obliquely upwards; and a slope part 332 sloping from an upper end of the contact part 331 to downwards. When an engagement portion 363a (see FIG. 12) to be described later formed in the enclosure 363 of the motor-driven retraction unit 360 comes in contact with the contact part 331, the mirror assembly is stopped at the use position. When the mirror assembly is stopped at the retracted position, the stopper 46 engages with the restriction groove 15. If the mirror assembly 4 is in the use position and is subjected to external force from a rear side to a front side of the auto body S, the engagement portion 363a of the enclosure 363 moves over the contact part 331. This allows the mirror assembly 4 to rotate along the slope part 332. The outer mirror can be thus prevented from being damaged by allowing the external force to escape.

Figure 12:
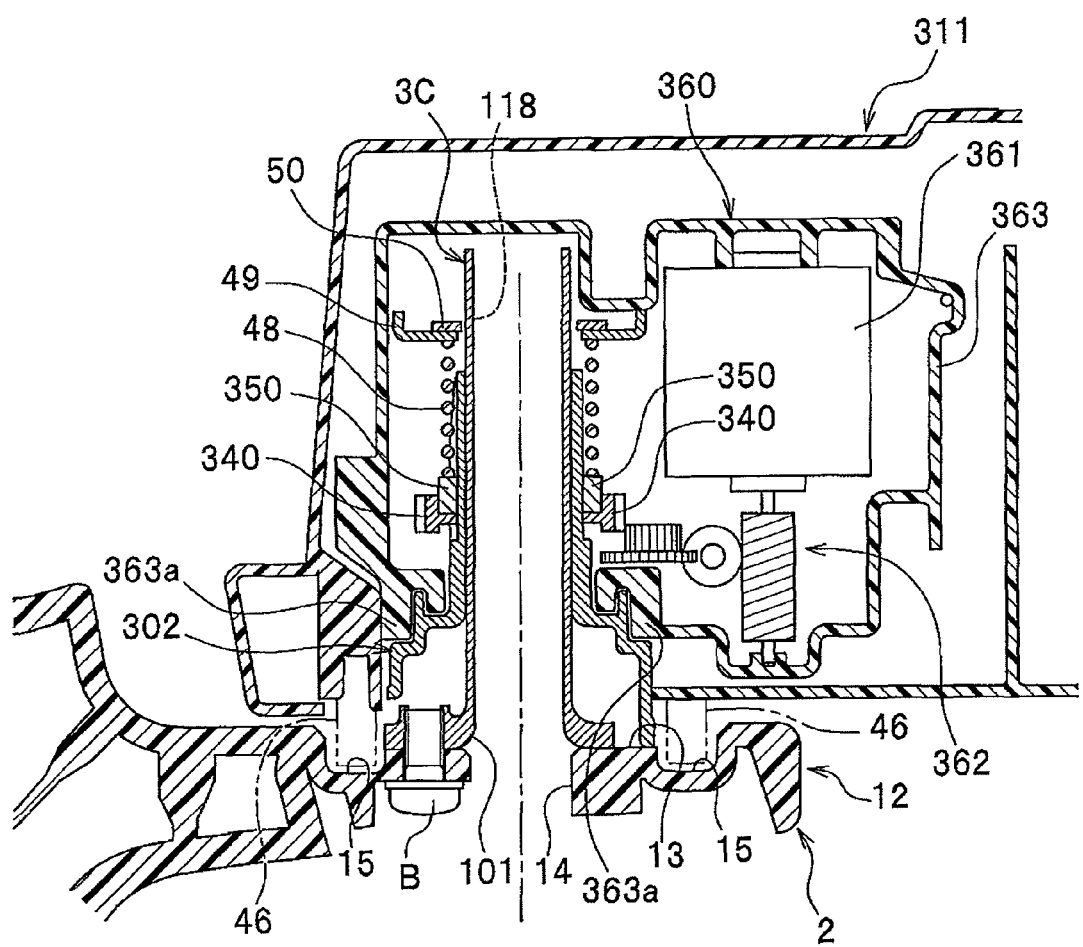
FIG. 12 is a cross sectional view illustrating how the shaft is assembled according to the third embodiment.

As shown in FIG. 10, the shaft 3C is formed by fitting the first member 101 and the second member 302 together. In this embodiment, a positioning between the first member 101 and the second member 302 in the up and down direction is achieved by contacting the positioning member 117 (see FIG. 8) of the first member 101 with an inner edge of the outer circumferential opening portion 322d. This makes the bottom surface of the first member 101 flush with a bottom surface of the second member 302. As shown in FIG. 12, the shaft 3C is fixed to the seating face 13 of the mirror base 2 via the machine screw B.

As shown in FIG. 12, the motor-driven retraction unit 360 is attached to the shaft 3C and rotates the mirror assembly 4 by electric motor to the retracted position or the use position. The motor-driven retraction unit 360 includes: a motor 361; a gearing mechanism 362; a plate gear 340; a plate clutch 350; a coil spring 48 (which may also be referred to as an elastic member); a washer 49; a catch member 50; and the enclosure 363 in which all of the above components are enclosed. The motor-driven retraction unit 360 is fixed to a frame 311 and is housed in a housing (not shown).

Torque of the motor 361 is transmitted to the plate gear 340 via the gearing mechanism 362 constituted by a plurality of gears and worms. Upon transmission of the torque, the motor-driven retraction unit 360 rotates about the plate gear 340. The motor 361 starts driving by operating a switch not shown disposed in the automobile, and an output shaft of the motor 361 rotates. If a value of current fed to the motor 361 exceeds a prescribed threshold due to action of external force against rotation of the output shaft, a control circuit not shown disposed in the automobile cuts off the current fed to the motor 361.

In the gearing mechanism 362, torque is transmittable in only one direction from the output shaft of the motor 361 to the shaft 3C. The enclosure 363 encloses the motor 361, the gearing mechanism 362, the shaft 3C, and the like. The enclosure 363 includes engagement portions 363a, 363a coming in contact with the restriction portions 326a, 326b of the shaft 3C, respectively.

The plate gear 340 and the plate clutch 350 are attached around the shaft 3C. The shaft 3C, the plate gear 340, and the plate clutch 350 constitute the clutch mechanism.

As shown in FIG. 10, the plate gear 340 is formed of a ring and includes: an outer circumferential portion 341; and an inner circumferential portion 342 formed along an inner circumference of the outer circumferential portion 341. External teeth 343 are formed on an outer circumferential surface of the outer circumferential portion 341 and are connected to the gearing mechanism 362 (see FIG. 12). The inner circumferential portion 342 is formed of a ring on the inner circumference of the outer circumferential portion 341 and includes four concave portions 344 on a top surface thereof. The concave portion 344 has a trapezoidal shape when viewed from a side and is wider in a lower portion thereof than in an upper portion thereof.

The plate clutch 350 is formed of a ring and has an outer diameter substantially equal to an inner diameter of the outer circumferential portion 341 of the plate gear 340. The plate clutch 350 has, on a lower surface thereof, four protruding portions 351 engaging with the respective concave portions 344 of the plate gear 340. The protruding portion 351 has a trapezoidal shape when viewed from a side and is wider in an upper portion thereof than in a lower portion thereof. The clutch plate 350 has, on an inner circumference thereof, five equally-spaced concave grooves 352 engaging with the respective protrusions 328 (see FIG. 11) of the second member 302.

The plate gear 340 and the plate clutch 350 are inserted into the shaft 3C, to thereby engage the concave grooves 352 of the plate clutch 350 with the respective protrusions 328 of the second member 302. This makes it impossible for the plate clutch 350 to rotate with respect to the shaft 3C while making it possible to move in a vertical direction. Usually, the protruding portions 351 of the plate clutch 350 are engaged with the respective concave portions 344 of the plate gear 340, to thereby join the plate gear 340 and the plate clutch 350. That is, the plate gear 340 usually does not rotate relative to the shaft C3.

As shown in FIG. 12, the coil spring 48 is inserted in the shaft 3C and is disposed above the plate clutch 350. A top portion of the coil spring 48 is fixed to the catch part 118 via the washer 49 and the catch member 50. This makes the motor-driven retraction unit 360 and the frame 311 pressed toward the mirror base 2 with respect to the shaft 3C.

Next are described operations of the outer mirror according to this embodiment. In response to an operation of a switch by a driver, the motor 361 is driven and its rotative force is given to the plate gear 340 via the gearing mechanism 362. A reaction force of the rotative force rotates the motor-driven retraction unit 360. This in turn rotates the mirror assembly 4 which houses the motor-driven retraction unit 360 from the retracted position to the use position and vice versa.

When the mirror assembly 4 rotates from the retracted position to the use position, the engagement portions 363a, 363a of the enclosure 363 come in contact with the contact parts 331, 331 (see FIG. 10) of the restriction portions 326a, 326b of the shaft 3C, as shown in FIG. 12. This restricts a rotation of the mirror assembly 4 toward a front of the auto body S beyond the use position. Therefore, the motor 361 cannot rotate, and a value of currents flowing in the motor 361 increases over a prescribed threshold. This cuts off the currents fed to the motor 361, resulting in a stop of the motor 361.

If a given external force acts on the mirror assembly 4 from an automobile rear side to an automobile front side when the mirror assembly 4 is in the use position, the clutch mechanism operates. More specifically, if the external force exceeds a prescribed threshold, the plate clutch 350 displaces upward against energizing force of the coil spring 48, and the protruding portions 351 of the plate clutch 350 slide away from the respective concave portions 344 of the plate gear 340. This releases the joined state between a motor 361 side and a shaft 3C side, thus allowing the plate gear 340 and the motor-driven retraction unit 360 to rotate about the shaft 3C. Further, the engagement portions 363*a*, 363*a* of the enclosure 363 move over the contact parts 331, 331 of the shaft 3C. This allows the plate gear 340 and the motor-driven retraction unit 360 to rotate along the slope parts 332, 332. Thus, even if the mirror assembly 4 is subjected to external force, the outer mirror can be prevented from being damaged by allowing the external force to escape.

On the other hand, if a given external force acts on the mirror assembly 4 from the body front side to the body rear side when the mirror assembly 4 is in the use position, the clutch mechanism also operates. More specifically, if the external force exceeds a prescribed threshold, the plate clutch 350 displaces upward against energizing force of the coil spring 48, and the protruding portions 351 of the plate clutch 350 slide away from the respective concave portions 344 of the plate gear 340. This releases the joined state between the motor 361 side and the shaft 3C side, thus allowing the plate gear 340 and the motor-driven retraction unit 360 to rotate about the shaft 3C. Thus, even if the mirror assembly 4 is subjected to an external force, the outer mirror can be prevented from being damaged by allowing the external force to escape.

As described above, in the third embodiment, the first member 101 can be used for the shaft 3C, though the third embodiment is different from the first and second embodiments in that the outer mirror rotates by electric motor and is provided with two clutch mechanisms. That is, the third embodiment has a configuration in which the second member 302 is fitted in with the first member 101 by inserting the second member 302 from above the first member 101. Thus, even if the second member 102 is modified in shape, the first member 101 does not require corresponding modification. This enables a shared use of the first member 101 in various configurations, thus allowing a reduction in cost of manufacturing.

Fourth Embodiment

Next is described a fourth embodiment of the present invention. An outer mirror according to the fourth embodiment has a configuration similar to that of the first embodiment except that a first member of a shaft is formed symmetrically when viewed from the above. Thus, in the fourth embodiment, detailed description of the similar configuration is omitted except the shape of the first member.

Figure 13A:
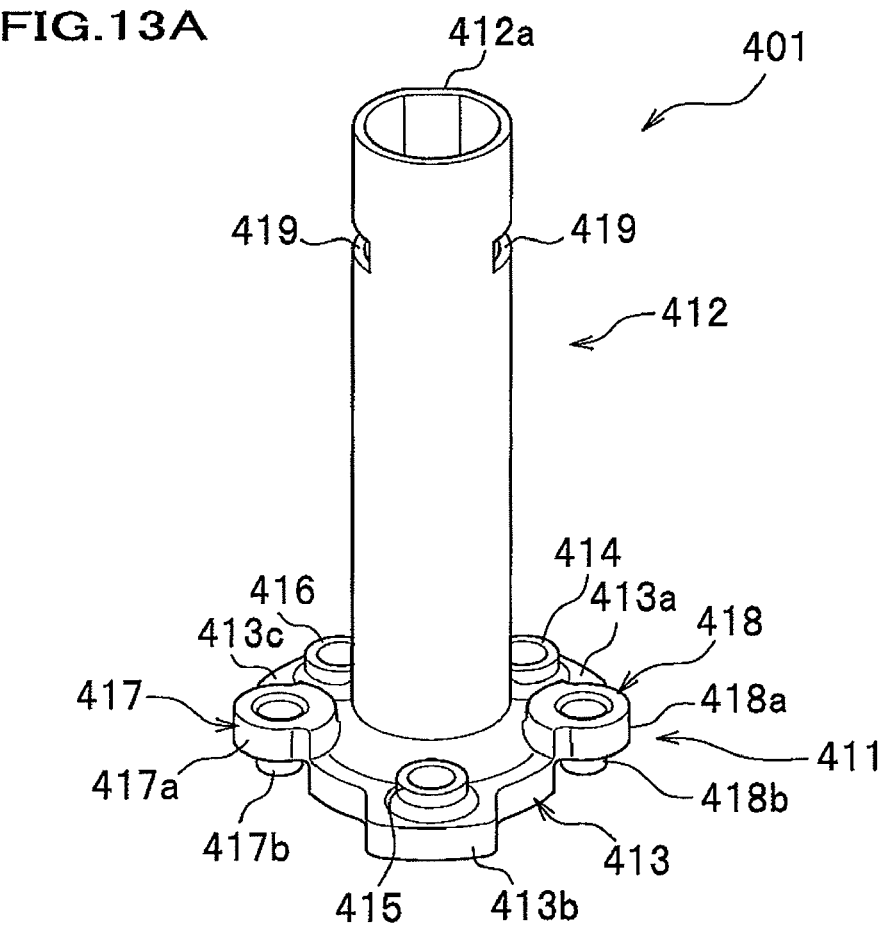
FIG. 13A and FIG. 13B are a perspective view and a plan view each illustrating a first member of a shaft according to a fourth embodiment, respectively.
Figure 13B:
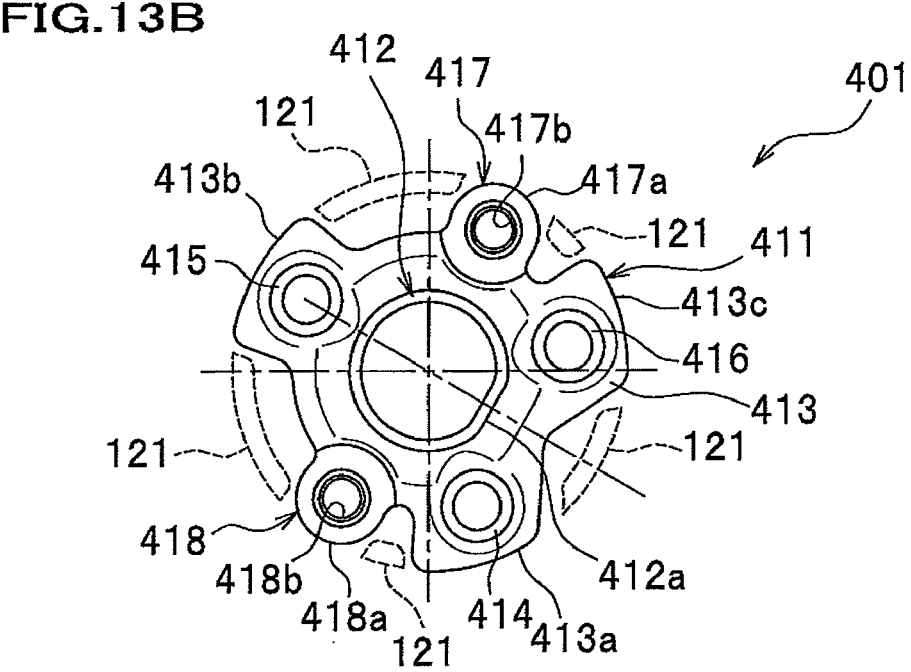

As shown in FIG. 13A and FIG. 13B, a first member 401 includes, as main components: a base section 411; and a shaft section 412 vertically arranged on the base section 411.

The base section 411 includes: a plate-like base member 413; a first attachment boss 414, a second attachment boss 415, and a third attachment boss 416 each formed on the base member 413; and positioning members 417, 418. The base member 413 includes extended portions 413*a*, 413*b*, 413*c* radially extending from the shaft section 412 in three directions when viewed from the above. A bottom of the base member 413 is formed flush to thereby come in contact with the seating face 13 of the mirror base 2. Exterior edges of the extended portions 413*a*, 413*b*, 413*c* are concyclic. First, second, and third attachment bosses 414, 415, 416 are formed in the extended portions 413*a*, 413*b*, 413*c*, respectively.

The positioning member 417 includes: a connecting portion 417*a* continuously formed with the base member 413; and a pin 417*b* formed on a lower surface of the connecting portion 417*a*. The positioning member 417 is formed between the extended portions 413*b* and 413*c*. The positioning member 418 includes: a connecting portion 418*a* continuously formed with the base member 413; and a pin 418*b* formed on a lower surface of the connecting portion 418*a*. The positioning members 417, 418 are fitted into respective positioning bosses (not shown) formed on the mirror base 2, to thereby perform a positioning of the first member 101. As shown in FIG. 13B, the first member 401 is formed symmetrically with respect to a line connecting the center of the shaft section 412 and the second attachment boss 415.

The shaft section 412 is formed in a cylindrical shape. A positioning face 412*a* is disposed on a portion of an outer circumferential surface of the shaft section 412. The positioning face 412*a* is formed such that a perpendicular line of the positioning face 412*a* passes through the center of the shaft section 412 and the second attachment boss 415. Catch parts 419.419 are formed in an upper portion of the shaft section 412. The catch parts 419.419 are formed in positions symmetrical with respect to a line connecting the center of the shaft section 412 and the second attachment boss 415.

A form of a second member fitted in with the first member 401 is not specifically limited. For example, if it is the second member 102 (see FIG. 4) that is fitted in with the first member 401, as shown in FIG. 13B, the outer circumferential portions 121 of the second member 102 is disposed each between the extended portions 413*a*, 413*b*, 413*c* and the positioning members 417, 418.

In the fourth embodiment, the first member 401 is formed line-symmetrically when viewed from the above. This allows the first member 401 to be used for both a right and a left outer mirrors. Thus, cost of manufacturing can be further reduced.

Variation

Next is described a variation of the present invention featuring a catch part formed on a side nearer to a top of the shaft section of the first member and a catch member engaged with the catch part. The variation has a configuration similar to that of the first embodiment except the catch part and the catch member. Thus, in the variation, detailed description of the configuration similar to that of the first embodiment is omitted herefrom.

As shown in FIG. 14, catch parts 521, 521 are formed on a side nearer to a top of a shaft section 512 of a first member 501. The catch parts 521, 521 have the same shapes and are formed in positions symmetrical with respect to the center of the shaft section 512 when the first member 501 is viewed from the above. The catch part 521 is substantially L-shaped when viewed from a side.

The catch part 521 includes: a guide groove 522 notched on an outer circumferential surface of a cylindrical shaft section 512 from a top end toward a base end thereof; a catch groove 523 notched on the outer circumferential surface of the shaft section 512; and a connection groove 524 connecting the guide groove 522 and the catch groove 523.

Figure 14A:
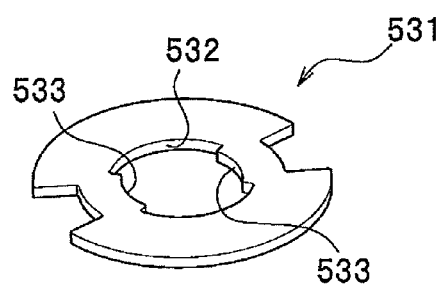
FIG. 14A is a perspective view illustrating a catch part and a catch member according to a variation.
Figure 14A:
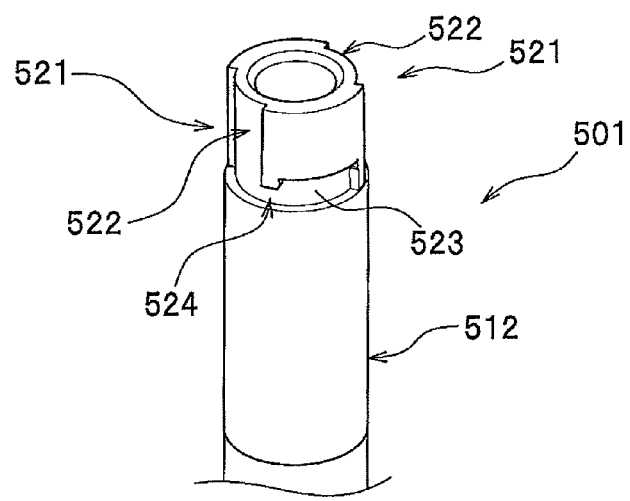
Figure 14B:
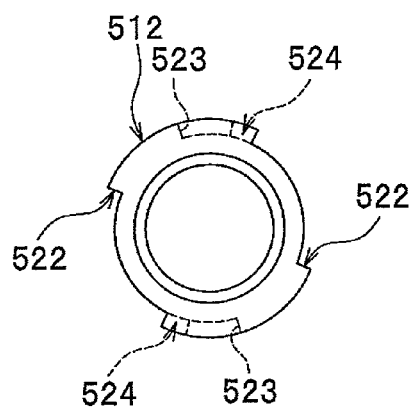
FIG. 14B is a plan view illustrating a shaft section according to the variation.

As shown in FIG. 14A and FIG. 14B, the guide groove 522 formed on the outer circumferential surface of the shaft section 512 at a prescribed height from the top end of the shaft section 512. The guide groove 522 guides a protruding part 533 of the catch member 531.

The catch groove 523 has a substantially rectangle shape when viewed from a side and is formed on the outer circumferential surface of the shaft section 512. A lower end of the catch groove 523 and a lower end of the guide groove 522 are formed at the substantially same heights. The catch groove 523 catches the protruding part 533 of the catch member 531.

The connection groove 524 connects the guide groove 522 and the catch groove 523. A lower end of the connection groove 524 is formed at the substantially same height as those of the guide groove 522 and the catch groove 523. A groove depth of the connection groove 524 is smaller than that of the catch groove 523.

Figure 14C:
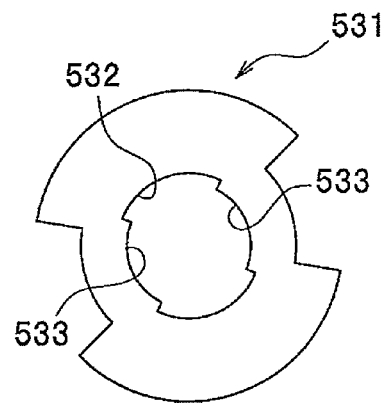
FIG. 14C is a plan view illustrating the catch member according to the variation.

As shown in FIG. 14A and FIG. 14C, the catch member 531 is a ring-shaped plate-like member and is caught by the catch parts 521, 521. When the catch member 531 is caught by the catch parts 521, 521, the coil spring 48 (see FIG. 7) comes in contact with a lower face of the catch member 531, to thereby enable the frame 41 to be pressed toward the mirror base 2.

The catch member 531 includes: an insert hole 532 inserted into the shaft section 512; and protruding parts 533, 533 protruding from an inner circumferential surface of the insert hole 532. A radius of an inner circumference of the insert hole 532 is formed substantially same as that of an outer circumference of the shaft section 512.

The protruding parts 533, 533 protrude from the inner circumference of the insert hole 532 toward the center thereof. The protruding parts 533, 533 have the same shapes and are formed in line-symmetric positions when viewed from the above. A top end edge of the protruding part 533 is formed of an arc. A radius of the arc is substantially same as that of an outer circumferential surface of the guide groove 522.

Next is described an operation of catching the catch member 531. The coil spring 48 (see FIG. 7) is inserted into the shaft section 512. While inserting the protruding parts 533, 533 of the catch member 531 into the guide grooves 522, 522 of the first member 501, the catch member 531 is moved downward against energizing force of the coil spring 48. When the catch member 531 comes in contact with an lower end of the guide groove 522, the catch member 531 is rotated along the connection groove 524. In the variation, the catch member 531 is rotated to the left when viewed from the above. When the protruding part 533 of the catch member 531 enters the catch groove 523, the catch member 531 is released from being pressed in. This makes the protruding part 533 caught by the catch groove 523 with energizing force of the coil spring 48. That is, the catch part 521 catches the catch member 531.

As described above, the variation is configured to have the catch part 521 and the catch member 531. This enables the catch member 531 to be caught in one operation, thus allowing the coil spring 48 to be easily assembled. The variation also has a configuration in which the catch parts 521, 521 as well as the protruding parts 533, 533 are arranged symmetrically with respect to the shaft section 512. This enables a well-balanced assembly. The variation eliminates a need of a washer (see reference numeral 49 in FIG. 1), unlike in the conventional technique, thus enabling a reduction in the number of components. The groove depth of the catch groove 523 is larger than that of the connection groove 524. This can stop a rotation of the protruding part 533 toward the guide groove 522, once the catch member 531 is caught into the catch groove 523. In the variation, it is thus ensured that the catch member 531 is caught. To release the catch member 531, operations of catching the catch member 531 are performed in reverse order, and description thereof is omitted herefrom. The variation is configured to have the connection groove 524. However, the variation may or may not be configured to have the connection groove 524.

The embodiments of the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims. For example, in addition to the described above, the shape of a second member of a shaft can be modified according to a configuration of a clutch mechanism. Further, in the embodiments, a configuration is exemplified in which a frame and a housing for housing the frame are formed separately. However, the frame and the housing may be formed as a single unit.

A shaft structure of a retractable outer mirror enables a shared use of components necessary for manufacturing outer mirrors regardless of an automobile type, a configuration of a clutch mechanism, whether an outer mirror is retracted by electric motor or manually, or the like.

The invention claimed is:

1. A shaft structure of a retractable outer mirror of an automobile, comprising:
    a mirror base disposed on a body of the automobile;
    a shaft fixed to the mirror base;
    a frame inserted into the shaft;
    a catch member caught on a side nearer to a top end of the shaft; and
    an elastic member disposed between the frame and the catch member,
    wherein the shaft comprises: a first member; and a second member,
    wherein the first member comprises: a base section having an attachment boss; a shaft section vertically arranged on the base section; and a catch part by which the catch member is caught,
    wherein the second member comprises: a clutch part that performs an engagement or a release of the engagement in response to rotation of the frame; and an insert portion inserted into the shaft section, and
    wherein the second member is fitted in with the shaft section from above a top end of the shaft section.

2. The shaft structure of a retractable outer mirror according to claim 1, wherein at least one of the first member and the second member is formed by deep-drawing a steel sheet.

3. The shaft structure of a retractable outer mirror according to claim 2, wherein the first member is formed line-symmetrically when viewed from the above.

4. The shaft structure of a retractable outer minor according to claim 3, wherein a bottom surface of the first member is flush with a bottom surface of the second member.

5. The shaft structure of a retractable outer mirror according to claim 3,
    wherein the catch part comprises: a guide groove extending from a top end toward a base end of the shaft section; and a catch groove extending from the guide groove toward a circumferential direction of the shaft section,
    wherein the catch member has an insert hole into which the shaft section is inserted; a protruding part protruding from an inner circumferential surface of the insert hole toward the center of the insert hole, and wherein the protruding part of the catch member is inserted into the guide groove of the catch part, the catch member is rotated in the circumferential direction of the shaft section while the elastic member is pressed down, and the protruding part is caught at the catch groove with energizing force of the elastic member.

6. The shaft structure of a retractable outer mirror according to claim 2, wherein a thickness of the base section of the first member is larger than a thickness of the shaft section.

7. The shaft structure of a retractable outer mirror according to claim 2, wherein a bottom surface of the first member is flush with a bottom surface of the second member.

8. The shaft structure of a retractable outer mirror according to claim 2,
    wherein the catch part comprises: a guide groove extending from a top end toward a base end of the shaft section; and a catch groove extending from the guide groove toward a circumferential direction of the shaft section,
    wherein the catch member has an insert hole into which the shaft section is inserted; a protruding part protruding from an inner circumferential surface of the insert hole toward the center of the insert hole, and
    wherein the protruding part of the catch member is inserted into the guide groove of the catch part, the catch member is rotated in the circumferential direction of the shaft section while the elastic member is pressed down, and the protruding part is caught at the catch groove with energizing force of the elastic member.

9. The shaft structure of a retractable outer mirror according to claim 1, wherein the first member is formed line-symmetrically when viewed from the above.

10. The shaft structure of a retractable outer mirror according to claim 9, wherein a thickness of the base section of the first member is larger than a thickness of the shaft section.

11. The shaft structure of a retractable outer mirror according to claim 9, wherein a bottom surface of the first member is flush with a bottom surface of the second member.

12. The shaft structure of a retractable outer mirror according to claim 9,
    wherein the catch part comprises: a guide groove extending from a top end toward a base end of the shaft section; and a catch groove extending from the guide groove toward a circumferential direction of the shaft section,
    wherein the catch member has an insert hole into which the shaft section is inserted; a protruding part protruding from an inner circumferential surface of the insert hole toward the center of the insert hole, and
    wherein the protruding part of the catch member is inserted into the guide groove of the catch part, the catch member is rotated in the circumferential direction of the shaft section while the elastic member is pressed down, and the protruding part is caught at the catch groove with energizing force of the elastic member.

13. The shaft structure of a retractable outer mirror according to claim 1, wherein a thickness of the base section of the first member is larger than a thickness of the shaft section.

14. The shaft structure of a retractable outer mirror according to claim 13,
    wherein the catch part comprises: a guide groove extending from a top end toward a base end of the shaft section; and a catch groove extending from the guide groove toward a circumferential direction of the shaft section,
    wherein the catch member has an insert hole into which the shaft section is inserted; a protruding part protruding from an inner circumferential surface of the insert hole toward the center of the insert hole, and
    wherein the protruding part of the catch member is inserted into the guide groove of the catch part, the catch member is rotated in the circumferential direction of the shaft section while the elastic member is pressed down, and the protruding part is caught at the catch groove with energizing force of the elastic member.

15. The shaft structure of a retractable outer mirror according to claim 1, wherein a bottom surface of the first member is flush with a bottom surface of the second member.

16. The shaft structure of a retractable outer mirror according to claim 1,
    wherein the catch part comprises: a guide groove extending from a top end toward a base end of the shaft section; and a catch groove extending from the guide groove toward a circumferential direction of the shaft section,
    wherein the catch member has an insert hole into which the shaft section is inserted; a protruding part protruding from an inner circumferential surface of the insert hole toward the center of the insert hole, and
    wherein the protruding part of the catch member is inserted into the guide groove of the catch part, the catch member is rotated in the circumferential direction of the shaft section while the elastic member is pressed down, and the protruding part is caught at the catch groove with energizing force of the elastic member.

\* \* \* \* \*